US012706961B2

(12) United States Patent
Bakker et al.

(10) Patent No.: US 12,706,961 B2
(45) Date of Patent: *Aug. 11, 2026

(54) SYSTEM AND METHOD FOR SHARING A SIP COMMUNICATION SERVICE IDENTIFIER

(71) Applicant: Malikie Innovations Limited, Dublin (IE)

(72) Inventors: Jan Hendrik Lucas Bakker, Fort Worth, TX (US); Andrew Michael Allen, Hallandale Beach, FL (US); Adrian Buckley, Tracy, CA (US)

(73) Assignee: Malikie Innovations Limited, Dublin (IE)

( * ) Notice: Subject to any disclaimer, the term of this patent is extended or adjusted under 35 U.S.C. 154(b) by 329 days.

This patent is subject to a terminal disclaimer.

(21) Appl. No.: 18/393,214

(22) Filed: Dec. 21, 2023

(65) Prior Publication Data

US 2024/0129344 A1 Apr. 18, 2024

Related U.S. Application Data

(63) Continuation of application No. 17/896,833, filed on Aug. 26, 2022, now Pat. No. 11,856,033, which is a continuation of application No. 17/112,636, filed on Dec. 4, 2020, now Pat. No. 11,463,487, which is a continuation of application No. 13/529,088, filed on Jun. 21, 2012, now Pat. No. 10,887,352, which is a continuation of application No. 12/209,032, filed on Sep. 11, 2008, now Pat. No. 8,249,561.

(60) Provisional application No. 60/971,495, filed on Sep. 11, 2007.

(51) Int. Cl.

| | |
|---|---|
| ***H04L 65/1063*** | (2022.01) |
| ***H04L 65/1016*** | (2022.01) |
| ***H04L 65/1104*** | (2022.01) |

(52) U.S. Cl.

CPC ...... *H04L 65/1063* (2013.01); *H04L 65/1016* (2013.01); *H04L 65/1104* (2022.05)

(58) Field of Classification Search

CPC ............. H04L 65/1063; H04L 65/1016; H04L 65/1104

See application file for complete search history.

(56) References Cited

U.S. PATENT DOCUMENTS

| | | | | |
|---|---|---|---|---|
| 6,807,173 | B1 | 10/2004 | Lee et al. | |
| 6,888,828 | B1 * | 5/2005 | Partanen ............ | H04L 65/1104 370/259 |
| 8,249,561 | B2 | 8/2012 | Bakker et al. | |
| 10,887,352 | B2 | 1/2021 | Bakker et al. | |

(Continued)

OTHER PUBLICATIONS

Johnston, A., et al., "Session Initiation Protocol Service Examples", Jul. 16, 2007—pp. 1-163, (Year: 2007).*

(Continued)

*Primary Examiner* — Farid Seyedvosoghi

(74) *Attorney, Agent, or Firm* — Conley Rose, P.C.; J. Robert Brown, Jr.

(57) ABSTRACT

A method for providing a user agent (UA) with service identification data. The method includes an application server (AS) transmitting Session Initiation Protocol (SIP) data. The SIP data comprises an identifier of the AS and a service identifier for at least one service supported by the AS. The method further includes the UA receiving the SIP data.

18 Claims, 11 Drawing Sheets

(56) References Cited

U.S. PATENT DOCUMENTS

| | | | |
|---|---|---|---|
| 11,463,487 B2 | 10/2022 | Bakker et al. | |
| 2002/0172338 A1 | 11/2002 | Lee et al. | |
| 2005/0058125 A1 | 3/2005 | Mutikainen et al. | |
| 2005/0220095 A1* | 10/2005 | Narayanan | H04L 69/329 370/389 |
| 2006/0031536 A1 | 2/2006 | Eydelman et al. | |
| 2006/0047840 A1* | 3/2006 | Postmus | H04L 65/1104 709/230 |
| 2006/0212511 A1 | 9/2006 | Garcia-Martin | |
| 2007/0002779 A1 | 1/2007 | Lee et al. | |
| 2007/0260739 A1 | 11/2007 | Buckley et al. | |
| 2008/0132161 A1 | 6/2008 | Chen et al. | |
| 2008/0159262 A1 | 7/2008 | Crable et al. | |
| 2008/0170563 A1 | 7/2008 | Zhu et al. | |
| 2008/0189414 A1* | 8/2008 | Astrom | H04L 65/1073 709/227 |
| 2008/0244709 A1* | 10/2008 | George | H04L 65/1104 726/4 |
| 2009/0067411 A1 | 3/2009 | Heidermark et al. | |
| 2022/0417292 A1 | 12/2022 | Bakker et al. | |

OTHER PUBLICATIONS

3GGP TS 24.173 V7.1.0; 3rd Generation Partnership Project; Technical Specification Group Core Network and Terminals; IMS Multimedia Telephony Communication Service and Supplementary Services; Stage 3; Release 7; Jun. 2007; 13 pages.

3GGP TS 24.229 V6.15.0; 3rd Generation Partnership Project; Technical Specification Group Core Network and Terminals; IP Multimedia Call Control Protocol based on Session Initiation Protocol (SIP) and Session Description Protocol (SDP); Stage 3; Release 6; Jun. 2007; 304 pages.

Johnston, A., et al.; "Session Initiation Protocol Service Examples"; draft-ietf-sipping-service-examples-13; Jul. 16, 2007; 163 pages.

ETSI TS 123 228 v7.8.0; Digital Cellular Telecommunications System (Phase 2+); Universal Mobile Telecommunications System (UMTS); IP Multimedia Subsystem (IMS); Stage 2; (3GPP TS 23.228 version 7.8.0 Release 7); Jun. 2007; 225 pages.

Rosenberg, J.; "Obtaining and Using Globally Routable User Agent (UA) URIs (GRUU) in the Session Initiation Protocol (SIP)"; draft-ietf-sip-gruu-11; Oct. 23, 2006; 33 pages.

Handley, M., et al.; "SDP: Session Description Protocol"; RFC 4566; Jul. 2006; 46 pages.

3GPP TSG CT1 Meeting #48; "Definition of Feature Tag for IARI/ICSI"; C1-071832; Vienna, Austria; Aug. 20-24, 2007; 19 pages.

Drage, K.; "A Session Initiation Protocol (SIP) Extension for the Identification of Services"; draft-drage-sipping-service-identification-01; Jul. 9, 2007; 22 pages.

Handley, M., et al.; "SIP: Session Initiation Protocol"; RFC 2543 Mar. 1999; 143 pages.

Rosenberg, J., et al.; "Session Initiation Protocol (SIP): Locating SIP Servers"; RFC 3263; Jun. 2002; 8 pages.

Schulzrinne, Henning, et al.; "Application-Layer Mobility Using SIP"; IEEE; 2000; 8 pages.

Rosenberg, J., et al.; "SIP: Session Initiation Procol"; RFC 3261; Jun. 2002; 252 pages.

Office Action dated Jul. 22, 2011; U.S. Appl. No. 12/209,032, filed Sep. 11, 2008; 21 pages.

Final Office Action dated Nov. 4, 2011; U.S. Appl. No. 12/209,032, filed Sep. 11, 2008; 16 pages.

Advisory Action dated Jan. 12, 2012; U.S. Appl. No. 12/209,032, filed Sep. 11, 2008; 3 pages.

Notice of Allowance dated May 25, 2012; U.S. Appl. No. 12/209,032, filed Sep. 11, 2008; 14 pages.

Office Action dated Jul. 20, 2012; U.S. Appl. No. 13/529,088, filed Jun. 21, 2012; 28 pages.

Final Office Action dated Jan. 23, 2013; U.S. Appl. No. 13/529,088, filed Jun. 21, 2012; 26 pages.

Advisory Action dated Apr. 4, 2013; U.S. Appl. No. 13/529,088, filed Jun. 21, 2012; 3 pages.

Office Action dated Dec. 13, 2016; U.S. Appl. No. 13/529,088, filed Jun. 21, 2012; 21 pages.

Final Office Action dated Apr. 28, 2017; U.S. Appl. No. 13/529,088, filed Jun. 21, 2012; 23 pages.

Office Action dated Dec. 22, 2017; U.S. Appl. No. 13/529,088, filed Jun. 21, 2012; 23 pages.

Final Office Action dated Jun. 14, 2018; U.S. Appl. No. 13/529,088, filed Jun. 21, 2012; 23 pages.

Advisory Action dated Sep. 17, 2018; U.S. Appl. No. 13/529,088, filed Jun. 21, 2012; 5 pages.

Notice of Allowance dated Sep. 17, 2020; U.S. Appl. No. 13/529,088, filed Jun. 21, 2012; 9 pages.

Office Action dated Mar. 25, 2022; U.S. Appl. No. 17/112,636, filed Dec. 4, 2020; 28 pages.

Notice of Allowance dated Jun. 23, 2022; U.S. Appl. No. 17/112,636, filed Dec. 4, 2020; 9 pages.

Office Action dated Mar. 22, 2023; U.S. Appl. No. 17/896,833, filed Aug. 26, 2022; 22 pages.

Notice of Allowance dated Aug. 9, 2023; U.S. Appl. No. 17/896,833, filed Aug. 26, 2022; 9 pages.

PCT Invitation to Pay Additional Fees; PCT Application No. PCT/US2008/076035; Apr. 28, 2009; 5 pages.

PCT International Search Report; Application No. PCT/US2008/076035; Aug. 7, 2009; 6 pages.

PCT Written Opinion of the International Searching Authority; Application No. PCT/US2008/076035; Aug. 7, 2009; 9 pages.

PCT International Preliminary Report on Patentability; Application No. PCT/US2008/076035; Feb. 10, 2010; 15 pages.

* cited by examiner

Fig. 10
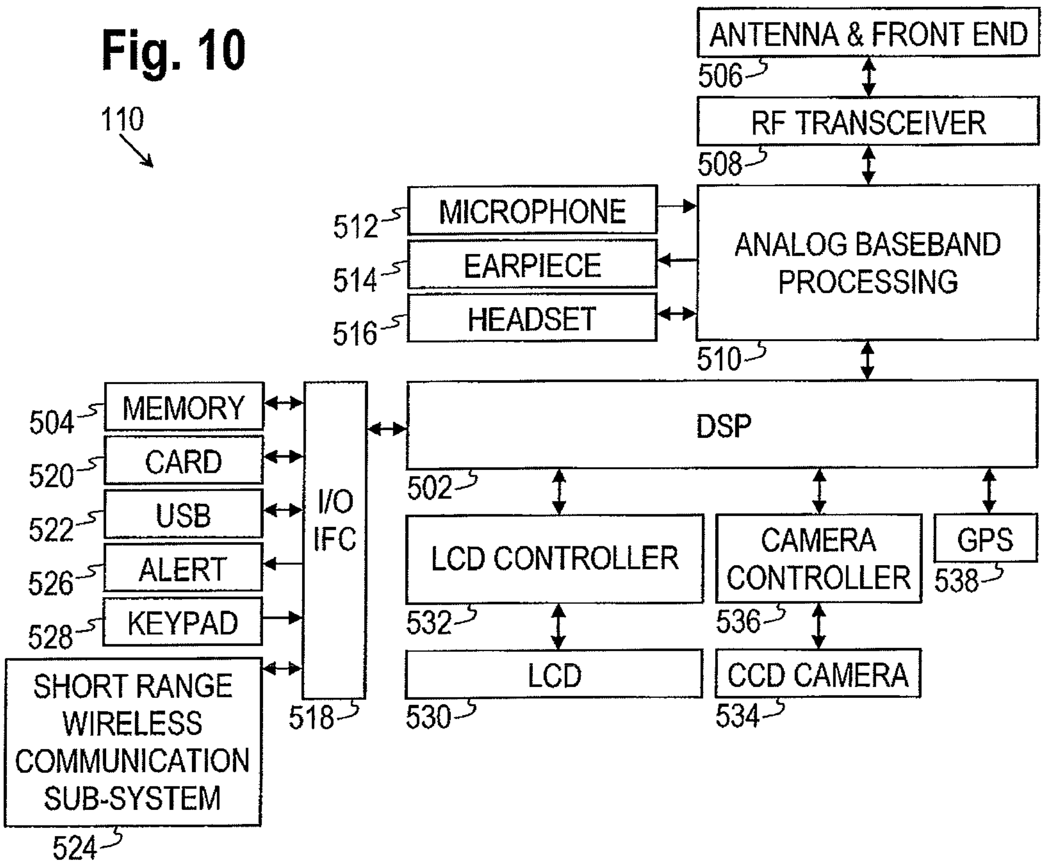
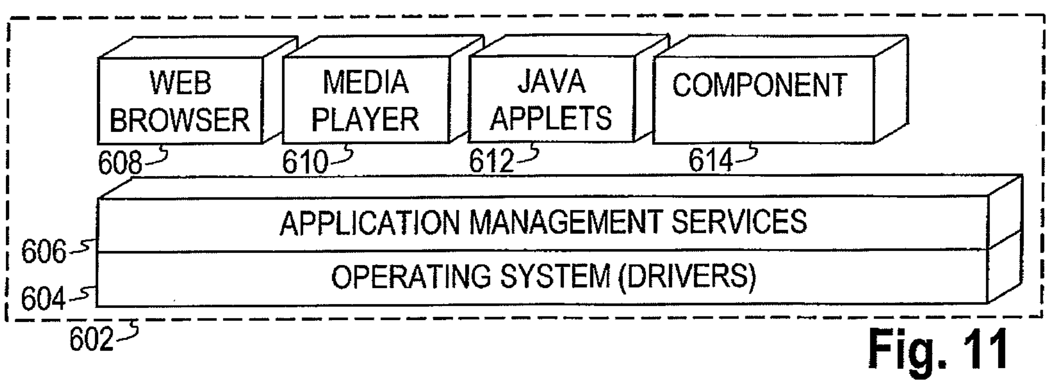
Fig. 11

SYSTEM AND METHOD FOR SHARING A SIP COMMUNICATION SERVICE IDENTIFIER

CROSS-REFERENCE TO RELATED APPLICATIONS

This application is a continuation of U.S. patent application Ser. No. 17/896,833 filed Aug. 26, 2022 by Jan Hendrik Lucas Bakker, et al. entitled, "System and Method for Sharing a SIP Communication Service Identifier", which is a continuation of U.S. patent application Ser. No. 17/112,636 filed Dec. 4, 2020, by Jan Hendrik Lucas Bakker, et al. entitled "System and Method for Sharing a SIP Communication Service Identifier", which is a continuation of U.S. patent application Ser. No. 13/529,088 filed Jun. 21, 2012, by Jan Hendrik Lucas Bakker, et al. entitled "System and Method for Sharing a SIP Communication Service Identifier", which is a continuation of U.S. patent application Ser. No. 12/209,032 filed Sep. 11, 2008, by John-Luc Bakker, et al. entitled "System and Method for Sharing a SIP Communication Service Identifier", which claims priority to U.S. Provisional Patent Application No. 60/971,495 filed Sep. 11, 2007, by John-Luc Bakker, et al., entitled "System and Method for Identifying a SIP Communication Service Identifier", all of which are incorporated by reference herein as if reproduced in their entirety.

BACKGROUND

The IP (Internet Protocol) Multimedia Subsystem (IMS) is a standardized architecture for providing multimedia services and voice-over-IP calls to both mobile and fixed user agents (UAs). The Session Initiation Protocol (SIP) been standardized and governed primarily by the Internet Engineering Task Force (IETF) as a protocol for setting up and managing IMS-based calls. As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as fixed line telephones, desktop computers, set-top boxes, or network nodes. When a UA is a network node, the network node could act on behalf of another function such as a UA or a fixed line device and simulate or emulate the UA or fixed line device. For example, for some UAs, the IMS SIP client that would typically reside on the device actually resides in the network and relays SIP message information to the device using optimized protocols. In other words, some functions that were traditionally carried out by a UA can be distributed in the form of a remote UA, where the remote UA represents the UA in the network. The term "UA" can also refer to any hardware or software component that can terminate a communication session that could include, but is not limited to, a SIP session. Also, the terms "user agent", "UA", "user equipment", "UE", and "node" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 10 is a block diagram of a UA operable for some of the various embodiments of the disclosure.

FIG. 11 is a diagram of a software environment that may be implemented on a UA operable for some of the various embodiments of the disclosure.

DETAILED DESCRIPTION

Figure 1:
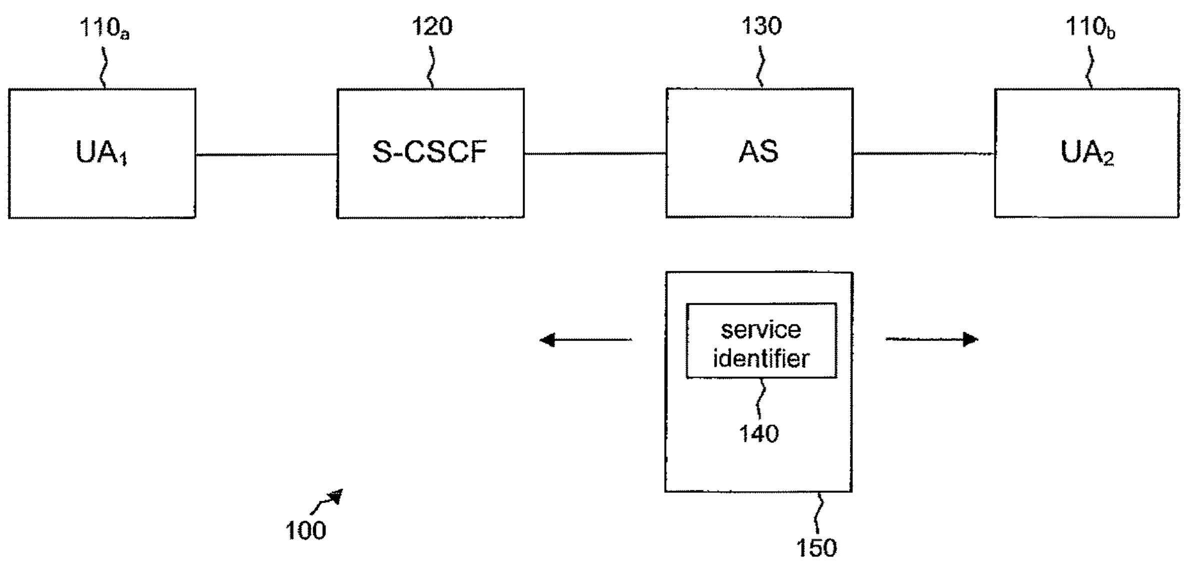
FIG. 1 is a block diagram of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method for providing a user agent (UA) with service identification data is provided. The method includes an application server (AS) transmitting Session Initiation Protocol (SIP) data (see IETF RFC 3261). The SIP data comprises an identifier of the AS and a service identifier for at least one service supported by the AS. The method further includes the UA receiving the SIP data.

In an embodiment, a user agent (UA) is provided. The UA includes a processor configured to receive Session Initiation Protocol (SIP) data. The SIP data comprises an identifier of an application server (AS) and a service identifier for at least one service supported by the AS.

In an embodiment, a network component is provided. The network component includes a processor configured to transmit Session Initiation Protocol (SIP) data. The SIP data comprises an identifier of the network component and a service identifier for at least one service supported by the network component.

The IMS architecture allows UAs to be provided with services such as call waiting, call forwarding, reception of multimedia content, and other well known services. The services are typically provided by application servers or similar components in an IMS network. A serving call session control function (S-CSCF) or a similar component in the IMS network typically identifies that an incoming message is invoking a particular service and inserts an application server that can provide that service into the session path.

When two UAs are communicating or attempting to communicate, the type of exchange that occurs between them when one of them invokes a service depends on whether the application server that is providing the service is on the originating end of the session, the terminating end of the session, or both. It might be preferable that an application server providing a particular service be available to both the originating UE and the terminating UE (it should be understood that a UE as well as an application server as well as some other network element can each comprise at least one UA).

In an embodiment, a message that is sent to a UE from an application server (AS) that is providing a particular service includes a service identifier that identifies the application server and the service that is being provided. The service identifier might be provided to both the originating and the terminating UAs, by the same or by different ASes. The service identifier can inform the terminating UA of the services that are available from the servers that are on the route that an incoming message took. The service identifier can also indicate whether a server providing a service is an originating server or a terminating server.

FIG. 1 is a block diagram of an embodiment of a system 100 in which such service identifiers might be implemented. The system 100 includes a $UA_1$ $110_a$ that is capable of using IMS communication services or similar services. The $UA_1$ $110_a$ can communicate with another $UA_2$ $110_b$ that has similar capabilities. If $UA_1$ $110_a$ is originating a communication session request that is to be terminated at $UA_2$ $110_b$, $UA_1$ $110_a$ might first send a message to an S-CSCF 120. The S-CSCF 120 might then determine a service that the requested session is invoking and might insert into the session path an application server (AS) 130 that can provide that service. The application server 130 might be a telephony application server ((T)AS) or a similar component. As used herein, the term "(T)AS" can refer to a telephony application server specifically or to an application server or a similar network node in general. The functionality on the application server or network node need not be the same as that is associated with a "(T)AS" and could be any application/service that the service providers want to provide. The application server 130 might connect the other $UA_2$ $110_b$ into the session and provide the invoked service. The application server 130 might route the communication session request back to the S-CSCF 120, which might route it in the direction of $UA_2$ $110_b$. The communication session request might pass other S-CSCFs or the same S-CSCF 120 and other (T)ASes or the (T)AS 130 while on its way to $UA_2$ $110_b$. The communication session request may be diverted.

In an embodiment, the application server 130 can include a service identifier 140 in the header of a SIP message 150 that the application server 130 sends to the terminating $UA_2$ $110_b$ and/or to the originating $UA_1$ $110_a$. In some cases, the same SIP message 150 is sent to both $UA_1$ $110_a$ and $UA_2$ $110_b$. In other cases, different SIP messages 150 are sent to $UA_1$ $110_a$ and $UA_2$ $110_b$. The header that includes the service identifier 140 might be a Record-Route header, a Route header, a Via header, or a similar header or even a new header. Alternatively, the service identifier 140 could be included in a Contact address. The service identifier 140 can be used to identify that an application server that provides a service is available to the UAs 110 and also the address or URI of the application server 130 that provides the service. The service identifier 140 may satisfy the property that if the same (T)AS 130 provides services to both $UA_1$ $110_a$ and $UA_2$ $110_b$, $UA_1$ $110_a$ and $UA_2$ $110_b$ will each be able to determine that the (T)AS 130 is indicating it offers services to $UA_1$ $110_a$ or $UA_2$ $110_b$. I.e., if both $UA_1$ $110_a$ and $UA_2$ $110_b$ share the same public identity, the AS 130 may be able indicate that it has instantiated a call model or UA or state within the (T)AS 130 to offer services to $UA_1$ $110_a$ and that it has instantiated another call model or UA or state within the (T)AS 130 to offer services to $UA_2$ $110_b$ since both UAs may be subscribed to the same service profile. For example, if a service identifier 140 includes a GRUU (or 'gr' parameter (with instance-id) according to IETF's Internet Draft "draft-ietf-sip-gruu") it would have the property of identifying the same AS as well as uniquely identifying the UA within.

Figure 2:
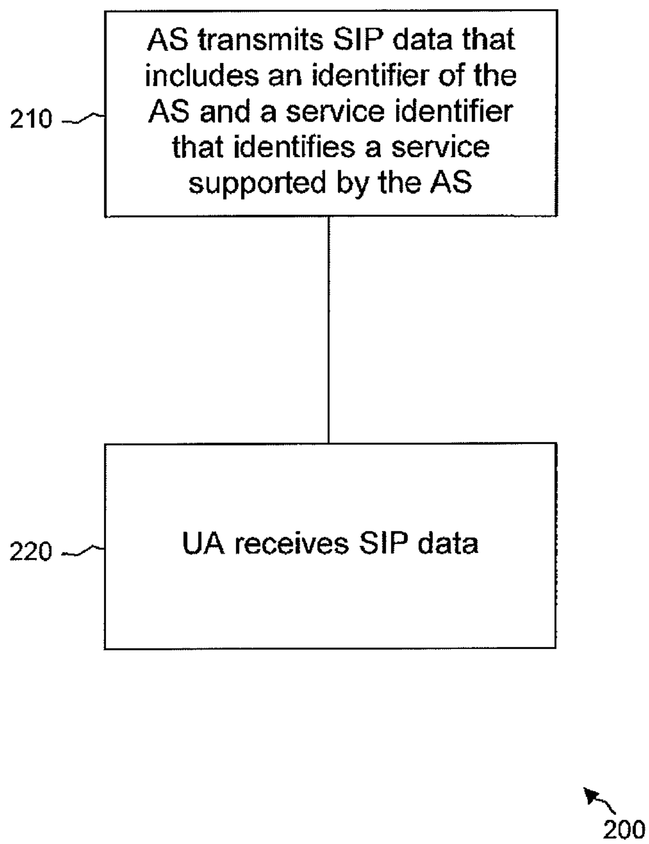
FIG. 2 is a diagram of a method for providing a user agent with service identification data according to an embodiment of the disclosure.

FIG. 2 is a diagram of a method 200 for providing a user agent with service identification data. At event 210, an application server transmits Session Initiation Protocol (SIP) data that includes an identifier of the application server and a service identifier that identifies at least one service supported by the application server. At event 220, the user agent receives the SIP data.

More specifically, when a (T)AS or other network node acting as a proxy forwards an incoming multimedia telephony-related SIP message (e.g. SIP INVITE request or other initial request), the (T)AS includes its Uniform Resource Identifier (URI) in the Record-Route header. If the terminating UA can recognize the URI of the (T)AS in the Record-Route header as that of the (T)AS, or UA within the (T)AS, serving it, then it can determine that the (T)AS is in the signaling route and can therefore provide the user with the capability to invoke the user's (e.g., supplementary) services. Likewise, if the originating UA can recognize the URI of the (T)AS in the Route header in the response as the (T)AS, or UA within the (T)AS, serving it, then it can determine that the (T)AS is in the signaling route and can therefore provide that user with the capability to invoke that user's (e.g. supplementary) services.

Also, the UA can obtain the URI of the AS that it may use to address certain SIP requests to perform or request certain service related functions or features.

According to Third Generation Partnership Project (3GPP) Technical Specification (TS) 24.229 and 3GPP TS 24.173, IMS communication services can be identified by means of one or more IMS Communication Service Identifiers (ICSI). The ICSI might be used for policing and charging purposes in the home network. A UA may indicate an ICSI in the P-Preferred-Service header. The home network can validate the ICSI and create a P-Asserted-Service header with appropriate ICSI values. The home network may even assign an ICSI and include a P-Asserted-Service header with an ICSI value if the P-Preferred-Service header is not present.

In an embodiment, a URI parameter can be set equal to the ICSI value for a particular service. This URI parameter can be included in a URI that a (T)AS includes in a Record-Route header. When a UA reads this URI, the UA can know that the (T)AS associated with the URI is providing the service associated with the URI parameter. The g.3gpp.app_ref parameter might be reused for this purpose, or another token could be defined for this parameter.

In addition, it may be necessary to identify whether the UA that is served by the particular (T)AS is the terminating UA or the originating UA. Identifying the terminating or originating UA served by the (T)AS might be necessary because it is possible that there will be (T)ASs for both the originating UA and the terminating UA and each needs to identify its own (T)AS. Each might also need to identify a (T)AS that serves it when there is only a single (T)AS on the signaling route (such as in a non-IMS to IMS scenario). Identifying the terminating or originating UA that the (T)AS serves can be achieved by including a parameter, or parameter with values, such as "orig" or "term" in the user portion of the SIP URI in the Record-Route header.

As an example, the (T)AS serving the originating UA could include in the Record-Route header the following URI:

```
Record-Route:
    <sip:orig@TAS.networkA.net;g.3gpp.app_ref=urn%3Aurn-xxx%3A3gpp-
        service.ims.icsi.mmtel>
```

and the (T)AS serving the terminating UA could include in the Record-Route header the following URI:

```
Record-Route:
    <sip:term@TAS.networkB.net;g.3gpp.app_ref=urn%3Aurn-xxx%3A3gpp-
        service.ims.icsi.mmtel>
```

ICSI. IMS Multimedia Telephony Communication Services are a subset of IMS Communication Services, and IMS Communication Services are a subset of SIP communication services. The present disclosure is not restricted to IMS Multimedia Telephony Communication Services or IMS Communication Services. As used herein, the terms "IMS Communication Services" and the like can be considered synonymous with the terms "SIP communication services" and the like, and the term "ICSI" can be considered synonymous with more general terms such as "SIP communication service identifier" or "SipCSI".

It should be noted that an MMTeI application is a capability, not a preference. An appropriate way for an inviting UA to represent this might be to include the MMTeI ICSI in the g.3gpp.app_ref media feature tag in the Contact header. In the case where a UA indicates multiple ICSI values in the g.3gpp.app_ref media feature tag in the Contact header, the MMTeI application can ensure that the MMTeI ICSI value is the first value in the list of values. This provides a hint that the UA supports and is using the MMTeI application.

If the (T)AS acts as a back-to-back UA (B2BUA), it may or may not include a Record-Route header. However, if it acts as a true UA, it will typically include its own URI in the Contact Header. In this case, the (T)AS might include its URI as above containing the g.3gpp.app_ref parameter along with "orig" or "term" in the user portion.

When the terminating UA receives a SIP INVITE or other initial request, it scans the list of Record-Route headers and the Contact header. If it finds a URI containing the g.3gpp.app_ref parameter "term" in the user part of the URI, it knows that a (T)AS has been assigned by the (home) network to provide (e.g., supplementary) services for the user. The UA can then use this information to provide the capability for the user to invoke (e.g., supplementary) services.

Likewise, the originating UA scans the list of Route headers and the Contact header in the 2000K response to find out if a (T)AS has been assigned to provide (e.g., supplementary) services for its user based upon finding a URI containing the g.3gpp.app_ref parameter "orig" in the user part of the URI.

When constructing a REGISTER request, UAs may include feature tags containing ICSI values in the Contact header, as described in Internet Engineering Task Force (IETF) Request for Comments (RFC) 3840. Either through registration or administratively, such ICSI values may cause any SIP requests (e.g., INVITE requests) that include one or more matching ICSI values in the Accept-Contact header to be routed to the UAs that registered the contact addresses, according to the mechanism in IETF RFC 3841 and algorithms in IETF RFC 2533.

The value representing IMS Multimedia Telephony Communication Services will be referred to herein as MMTeI It has been suggested that inclusion of the MMTeI ICSI value in the Contact header could make a UA aware that an IMS Multimedia Telephony Communication Service has been established by signaling this information via the Accept-Contact header. However, the use of the Accept-Contact header for such purposes may not be appropriate based on its currently agreed semantic in IETF RFC 3841. The present disclosure discusses how to signal that an intermediate SIP Server performing services on behalf of a UA has been inserted in the signaling route in order to provide such information to the terminating UA.

Several issues may arise when a server is inserted in the signaling route. On the originating side, when the use of IMS Multimedia Telephony Communication Services entails the inclusion of one or more (T)ASs and/or other (SIP) application servers, it may be desirable to indicate that the session being requested includes in the signaling path one or more application servers performing communication service logic. The indication might be provided to the terminating user's UA, the terminating user's proxy, and/or to the terminating user's IMS Multimedia Telephony Communication Services platform.

In addition, the originating user's S-CSCF and/or the terminating user's S-CSCF may use the ICSI values to include (T)ASs and/or other application servers in the path. The terminating user's proxy may use the indication of the ICSI values to resolve the terminating user's UA's capability of supporting one or more of the IMS Communication Services corresponding to the ICSI values. The terminating user's UA may use the ICSI values to select the appropriate logic in the UA that is capable of handling the IMS Communication Services corresponding to the application server-asserted ICSI values. Asserted indications may be used by the operator during its charging operations and to validate that the user has the appropriate subscriptions. The network may indicate failure of the request by, for example, returning a SIP 420 (Bad Extension) response if the proxies in the path do not support one or more of the IMS Communication Services corresponding to the ICSI values. A UA may wish to publish its support for certain IMS Communication Services corresponding to the ICSI values. This information could be stored in the address books of recipients and used when indicating a preference for reaching a UA that also understands the ICSI values.

The terminating UA may wish to execute IMS Multimedia Telephony Communication Services independent of whether or which IMS Multimedia Telephony Communication Services are executed by the originating UA. Receipt of an ICSI in the Accept-Contact header on the terminating side does not necessarily indicate that the suitable (T)ASs are in the signaling path or even that the originating UA is currently invoking the corresponding Communication Service.

In an embodiment, the Record-Route header or Via header or Route header or a yet to be defined new header (in the case of a SIP proxy or AS in the role of a proxy) or the Contact address (in the case of a SIP B2BUA or AS in the role of a B2BUA) could include an indication that an application server hosting an IMS Multimedia Telephony Communication Service is included in the signaling route. The indication might be referred to herein as a service identifier or a token. The token might alternatively be referred to as an identifier, an alphanumeric string, a feature tag, a fully qualified domain name, or some other term. The presence of the token could be interpreted as proof that some or all of the user's associated Multimedia Telephony Communication Services are in the session path.

The token might need to be unique per UA and public user identifier (PUID), since a UA may request a session to be set up with another UA with the same PUID (e.g., a husband calls a wife who shares his PUID). The token typically should uniquely identify a particular IMS Multimedia Telephony Communication Service for a particular Contact address. The Contact address can be used to publish that a UA supports some IMS Multimedia Telephony Communication Services. A UA can use this information to map the request to the corresponding logic and the (T)AS can use the token to map to the corresponding state machine. A token might uniquely identify a relation between an IMS Communication Service (originating or terminating), a subscriber, a user, and/or a unique identifier for a UA (e.g., a globally routable UA URI (GRUU)). The token might also assert to the UA that application servers capable of handling the ICSI indicated by the token in the Record-Route header are inserted in the session path. A SIP message (e.g., a SIP 420 (Bad Extension) response) may be returned if the terminating UA, proxy, or terminating network does not support the ICSI indicated.

Figure 3:
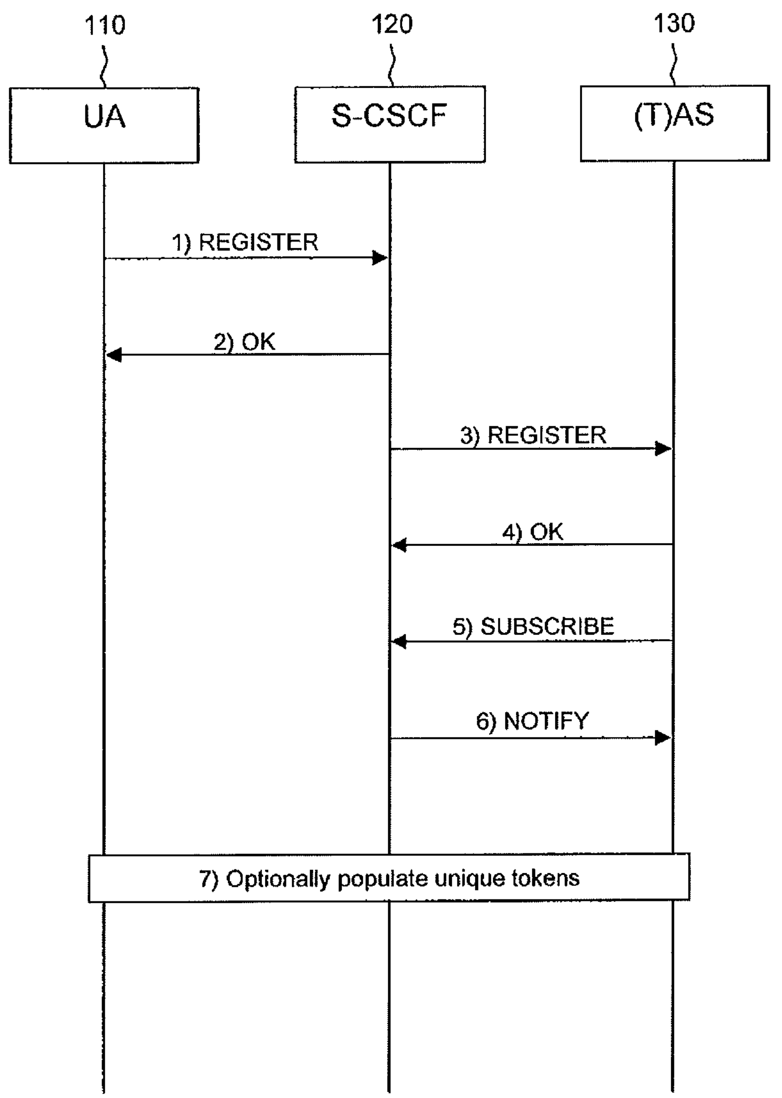
FIG. 3 is a call flow diagram according to an embodiment of the disclosure.

In one possible implementation, an S-CSCF informs interested application servers about a registration, using the procedures defined in clause 6.3 of 3GPP TS 23.218. The application servers may, in addition, subscribe to the S-CSCF Reg Event package. This provides a mechanism for an application server to discover all the implicitly registered PUIDs without requiring multiple REGISTER requests to be sent to the application server. This also allows the application server to obtain the current capabilities of a UA as well as to be notified about refresh registrations and de-registrations. The S-CSCF might send NOTIFY requests to the application server that has subscribed to the Reg Event package for the registered PUID. The Reg Event package also provides a mechanism for the application server to obtain the associated parameters (e.g., GRUUs, ICSIs, and IARIs) for each contact of every registered public identity. This is shown in FIG. 3. The final step in FIG. 3, "Optionally populate unique tokens", suggests that the (T)AS 130 or other application servers may wish to provision unique tokens or algorithms in the UA 110, one unique value per ICSI and UA 110 or per ICSI and PUID. Steps 3 to 6 are illustrative; in other embodiments other steps may be performed to obtain the information.

Figure 4:
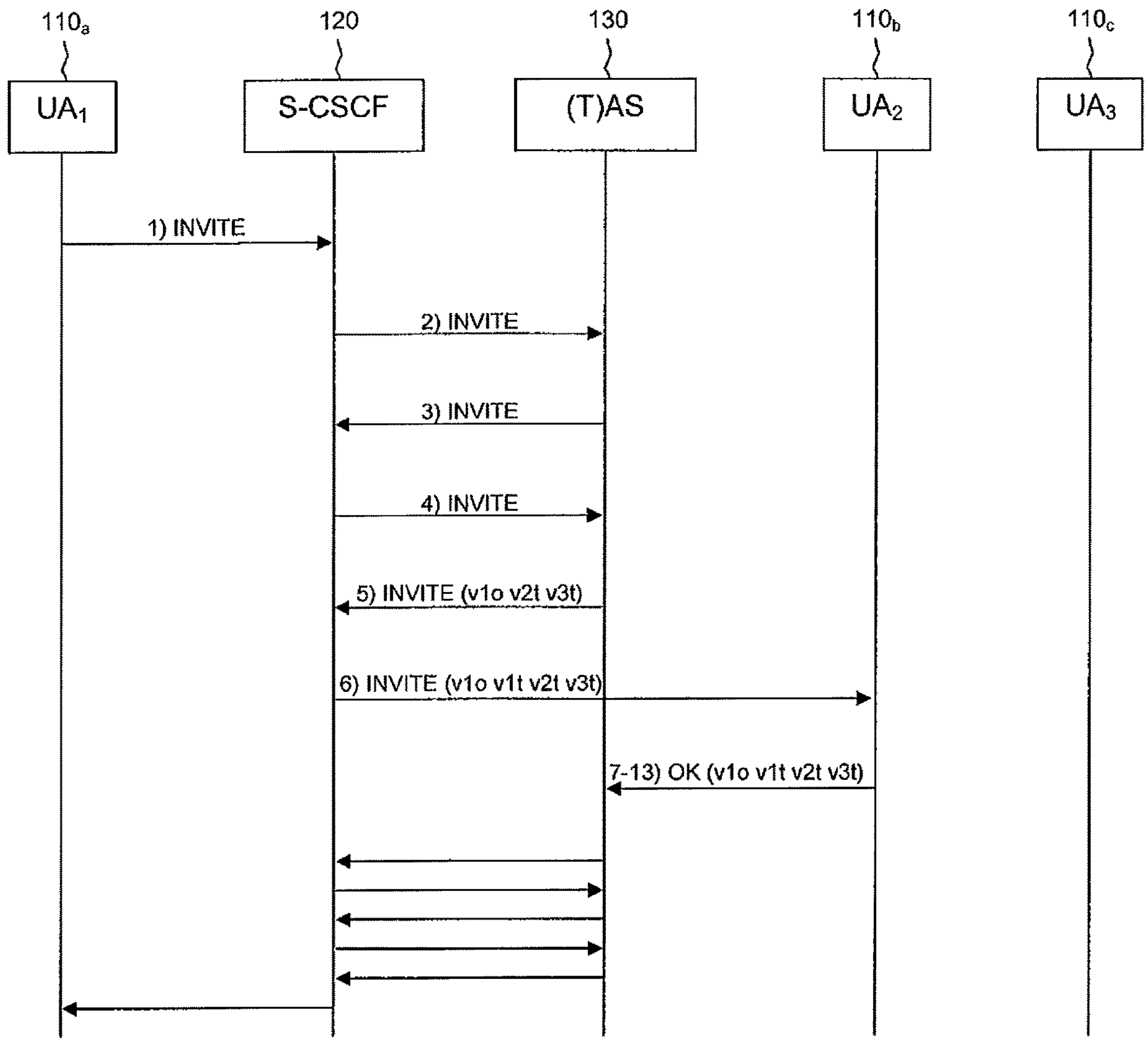
FIG. 4 is a call flow diagram according to an alternative embodiment of the disclosure.

FIG. 4 shows an originating UA$_1$ 110$_a$ initiating a session. In this figure, it is assumed that three UAs (UA$_1$ 110$_a$, UA$_2$ 110$_b$, and UA$_3$ 110$_c$) have all registered the same PUID (Public User Identity), have all third-party registered with the same (T)AS 130 and are all able to identify their unique value per the ICSI that they support. At step 3 and step 5, the (T)AS 130 can insert in the Record-Route header, Contact header, or some other header a token that is recognized by all UAs 110 registering with the same PUID and might initiate a state machine identified by that token. Because multiple UAs 110 have registered with the same PUID and forking may happen downstream, the (T)AS 130 might decide in this case to include a token that can be recognized by all UAs 110 registered under the same PUID for that particular IMS Communication Service identified by an ICSI. Before steps 7-13, the originating UA$_1$ 110$_a$ may have internally offered the INVITE to the logic supporting the SIP communication service identified by the token recognized by the UA 110. In turn, upon receipt of a SIP message with a token, (e.g., in the SIP responses to the INVITE messages in steps 7-13) the (T)AS 130 can hand the SIP message off to the state machines identified by the token.

Session border control elements (e.g., the 3GPP IMS Interconnect Border Control Function) should not strip the unique tokens. If they do, the UA 110 cannot be sure that an IMS Communication Service indicated by a token is supported by the network during the session.

A token or service identifier might need to possess certain properties in order to identify an ICSI. Certain structures might be needed to satisfy these properties, and certain ways might be needed for the UA to be able to recognize the token (e.g., according to step 7 in FIG. 3). One property is that the token might need to identify to the user that a server supporting the IMS communication service identified by the token is included on the route of SIP signaling for a session. An example might be sip:<publicuseridentity>@<icsi>.originatingleg.<operatorname>.net, where <icsi> could map to MMTel, <operatorname> could map to an operator name such as Verizon or Sprint, "originatingleg" (or alternatively, "orig") identifies this leg of the session as an originating leg, and <publicuseridentity> could map to the user portion of the user's public user identity URI, such as "john.doe". Also, the token might need to securely identify to the user that the IMS Communication Service identified by the token is in the session path. This may include the requirement that all other elements in the network (excluding UAs having registered the same PUID) perceive the token as an opaque value that is not to be removed from a SIP message (e.g., sip:foo2@foo1.terminatingleg.<operatorname>.com). The token might also need to identify to the application server which state machine belongs to the session. If multiple UAs registering with the same PUID are supported, and if one UA is allowed to call its own PUID, the token should be recognizable by all UAs registering with the same PUID. The token may also include an indication whether the application server inserting the token executes the IMS Communication Service on behalf of the originating UA or the terminating UA.

A UA should be able to recognize the token and should be able to map the token to a SIP communication service it supports. If the UA does not recognize the token, the UA may still be able to map the request to a SIP communication service it supports. For the UA to recognize its tokens, it should know what to look for, and the application servers inserting the tokens should know what the UA expects. In some cases, the UA and the application servers might agree on the tokens when the UA registers, for example by exchanging them. The UA could determine and share a token per SIP communication service, or the application servers could determine and share a token per SIP communication service. Alternatively, the tokens could be hard coded. If users with different PUIDs register, different tokens might be exchanged. In devices that use subscriber identity modules (SIMs), storage of the tokens might need to be resistant to the swapping of SIMs. Alternatively, an algorithm that is either hard coded or downloadable could allow the UA to identify the tokens and relate them with the corresponding SIP communication services. In any of these cases, device management (DM), short message service (SMS), unstructured supplementary service data (USSD), etc., can be used to inform the UA or the application server of mutually understood tokens that map to ICSIs. Alternatively, it may be possible to derive a token from a GRUU, an International Mobile Equipment Identity (IMEI), or an address of record (AOR).

Figure 5:
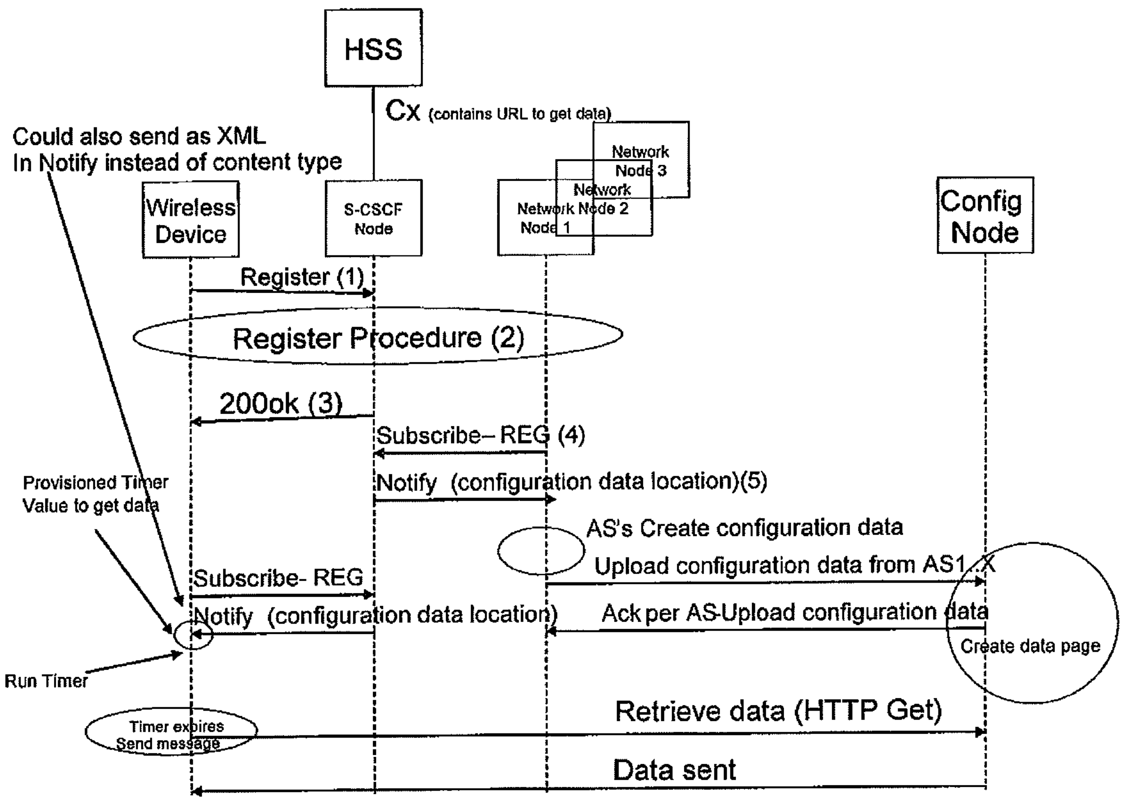
FIG. 5 is a call flow diagram according to an alternative embodiment of the disclosure.

FIG. 5 illustrates an alternative embodiment. In this case, when the UA registers with the IMS network, a home subscriber server (HSS) might download a profile of data over the Cx interface into the S-CSCF. One of the parameters of the profile might be a list of URLs (the list can have 0 to X entries) that identifies the location(s) where the configuration data for the subscriber is stored. The UA's registration with the network and the third-party registration might be performed using Initial Filter Criteria (iFC). One example might be that, when the SIP REGISTER arrives, the iFC could have additional triggers that indicate that if a token, such as an ICSI, is received in the SIP Contact header, then a third-party registration shall be sent to a network node, such as an application server, that supports the token.

Once the third-party registration has finished, the network node might then need to subscribe to the Reg Event package to obtain all the PUIDs and their corresponding GRUUs for that subscriber. The network node might also receive a message body according to some Content Type or a Content Type per IETF RFC 4483 describing the location where the configuration data is to be stored. Once the network node has this, the network node creates the configuration data and uploads it to the configuration node database per the URL received from the content type in the NOTIFY. If there are many network nodes that have received a third-party registration, all these network nodes could upload this configuration data to this database. The database could be available to all network nodes, could be in one network node, or all network nodes could have their own unique location to update the data.

As part of the SIP registration, the UA may subscribe to the Reg Event package, which delivers information back to the UA. The message that comes back (an example being SIP NOTIFY) can contain a Content type per IETF RFC 4483 that contains the location(s) of the configuration information needed by the UA that was downloaded from the HSS as described above. This information can be retrieved from the URL(s) as specified in the Content type or message body, can be stored in either removable or other types of memory, internal or otherwise, such as those listed below, and can be used for the initial session establishments by the UA for originated, terminated, or session continuity operations.

The following is an example of a SIP SUBSCRIBE message that could be used in this embodiment:

```
SUBSCRIBE sip:user_aor_1@example.net SIP/2.0
From: <sip:user_aor_1@example.net>;tag=27182
To: <sip:user_aor_1@example.net>
Call-Id: gbjg0b@ua.example.com
CSeq: 45001 SUBSCRIBE
Route: <sip:proxy.example.net;lr>
Event: reg
Expires: 3600
Accept: application/reginfo+xml
Contact: <sip:user_aor_1@example.net;gr=hha9s8d-999a>
Content-Length: 0
```

The memory types can include are but not limited to internal memory, CompactFlash, Type I, CompactFlash, Type II, SmartMedia, MMC, MMCplus, RS-MMC, MMCmobile, MMCmicro, Memory Stick Standard, Pro, Memory Stick Duo, Pro Duo, Memory Stick Micro, SD, miniSD, microSD, xD, USB, and other currently known or after developed memory device.

Figure 6:
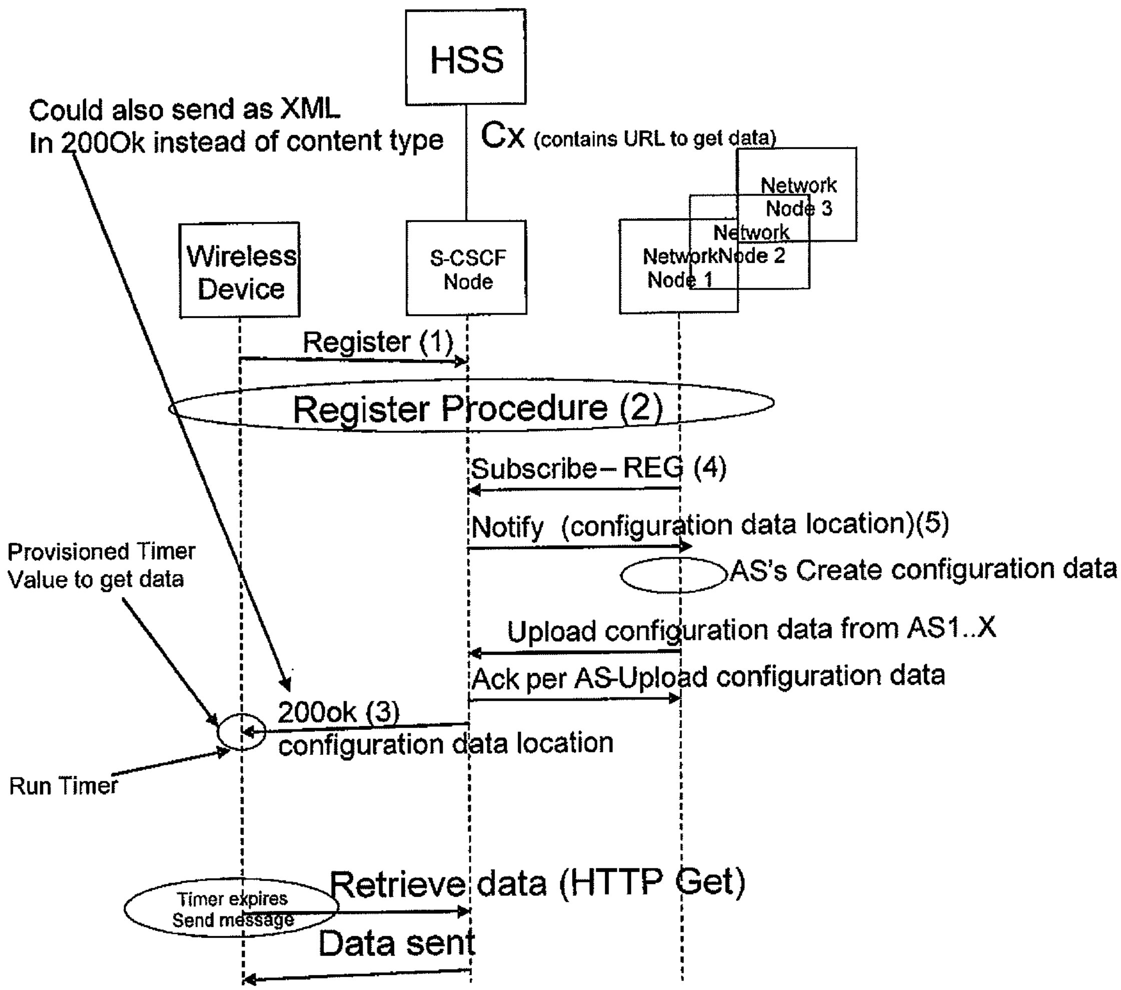
FIG. 6 is a call flow diagram according to an alternative embodiment of the disclosure.

FIG. 6 illustrates another alternative embodiment. In this implementation, the Config Node is the S-CSCF or can be another node. In this case, the 200 (OK) response is not immediately sent back to the UA when the registration procedure is finished. The S-CSCF holds the 200 (OK) response for a period of time specified by a timer (not shown) and/or until a body to be included in the SIP 200 (OK) response has been populated or until the config node has been populated. If needed, the running of the timer allows the application servers to populate the Config Node function and then send back the 200 (OK) response with the location of the data and the Config Node.

Figure 7:
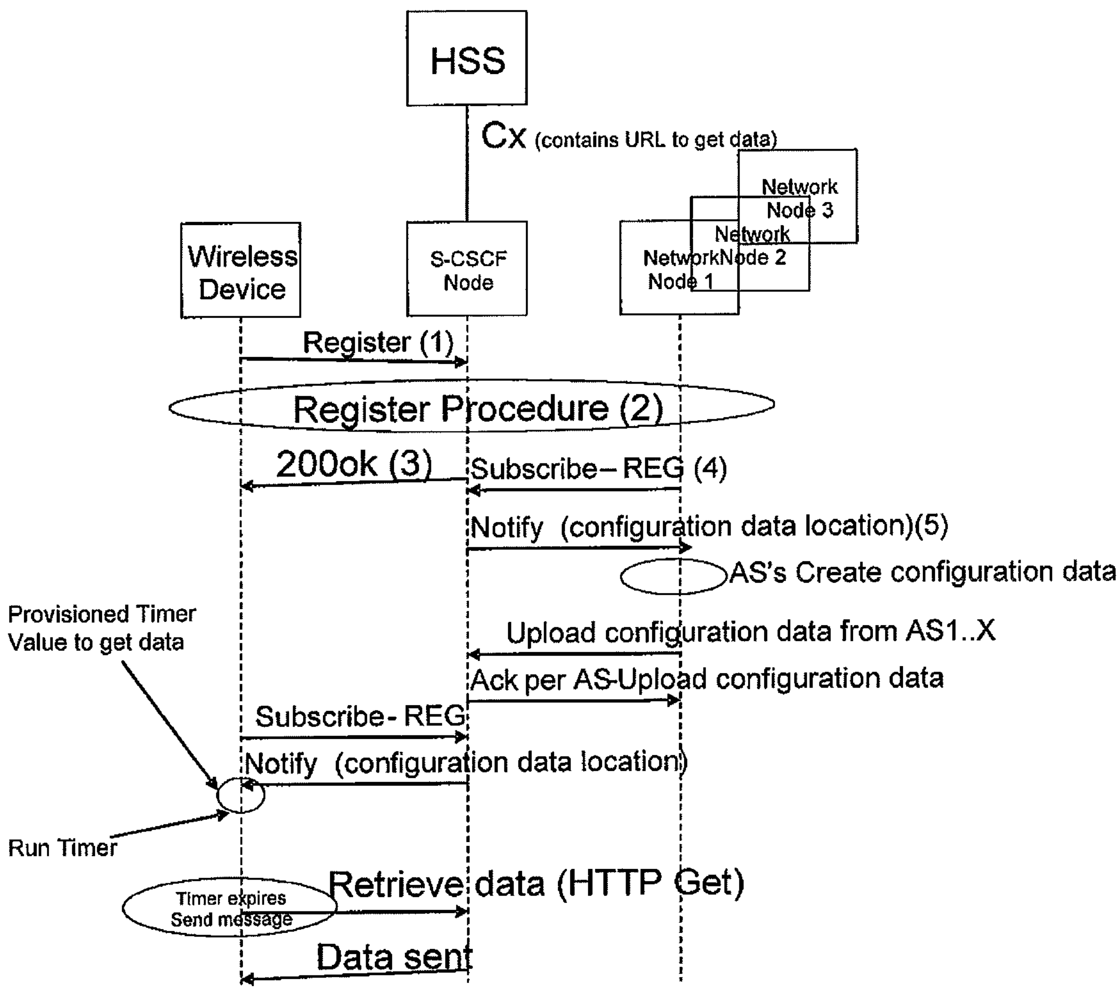
FIG. 7 is a call flow diagram according to an alternative embodiment of the disclosure.

FIG. 7 illustrates another alternative embodiment. This implementation is similar to the implementation of FIG. 5, except that in this case the Config Node is co-located with the S-CSCF so that the URL provided to the S-CSCF from the HSS points to the S-CSCF. Thus, each application server will populate the relevant page on the S-CSCF with its semi-dynamic configuration data for the UA. This could include downloading XCAP/XML information.

Figure 8:
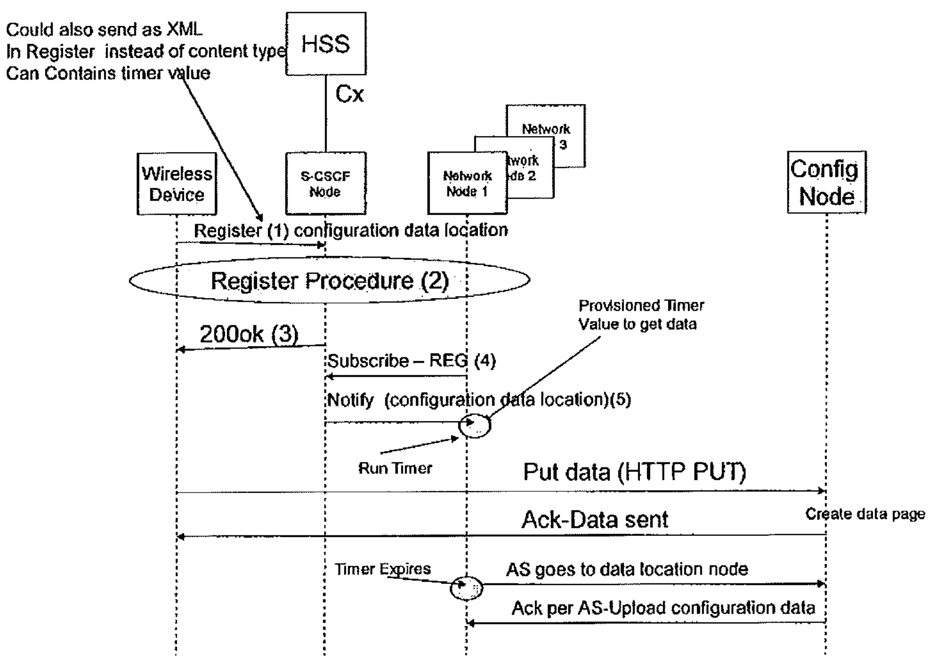
FIG. 8 is a call flow diagram according to an alternative embodiment of the disclosure.

FIG. 8 illustrates another alternative embodiment. This alternative represents the reverse case, where the UA uploads the tokens and/or algorithms to the network using the REGISTER request it transmits (or an SMS or XCAP method). The UA could put a 3GPP XML IM CN body (part) or another body (part) with the tokens and their mappings in the SIP REGISTER request's body, or it could put a URL in the request. It could then be assumed that the S-CSCF either directly forwards this information to the application servers in question or enables retrieval of this information. The application server could then download from the URL provided by the UA (pointing to a web browser on the UA or pointing to a web page/server elsewhere in the network that makes these tokens available). With registration, if a depository is referenced, a certain time might need to be given to the UA to make the deposit, so a timer value could be sent in the XML. The application server can receive the timer value and know that it should act after the timer value has expired.

The following Open Mobile Alliance (OMA) Device Management (DM) techniques can be used to statically or dynamically provision SipCSIs and their tokens or algorithms. A token_identity_List interior node can be used to allow a reference to a list of SIP communication services (e.g., hosted on application servers) that can provide a certain service to the device. The Occurrence might be One, the Format might be node, the Access Types might be Get, and the Values might be N/A. A run-time tokens_List node can act as a placeholder for one or more tokens. The Occurrence might be OneOrMore, the Format might be node, the Access Types might be Get, and the Values might be N/A. A Public_user_identity leaf can represent one or more public user identities. The Occurrence might be One, the Format might be chr, the Access Types might be Get, and the Values might be <token>. An example of a token might be sip: username@domain.com, where "username" is an element that identifies the user and "domain.com" identifies the application server, as well as whether it is the originating user's session leg or the terminating user's session leg.

```
<Node>
    <NodeName>token_identity_List</NodeName>
    <!-- The token_identity_List node starts here. -->
    <DFProperties>
        <AccessType>
            <Get/>
        </AccessType>
        <DFFormat>
            <node/>
        </DFFormat>
        <Occurrence>
            <One/>
        </Occurrence>
        <Scope>
            <Permanent/>
        </Scope>
        <DFTitle>A collection of token identity objects.</DFTitle>
        <DFType>
            <DDFName/>
        </DFType>
    </DFProperties>
    <Node>
        <NodeName/>
        <DFProperties>
            <AccessType>
                <Get/>
            </AccessType>
            <DFFormat>
                <node/>
            </DFFormat>
            <Occurrence>
                <OneOrMore/>
            </Occurrence>
            <Scope>
                <Dynamic/>
            </Scope>
            <DFTitle>The "name" node for token identity object.</DFTitle>
            <DFType>
                <DDFName/>
            </DFType>
        </DFProperties>
        <Node>
            <NodeName>token_identity</NodeName>
            <DFProperties>
                <AccessType>
                    <Get/>
                </AccessType>
                <DFFormat>
                    <chr/>
                </DFFormat>
                <Occurrence>
                    <One/>
                </Occurrence>
                <Scope>
                    <Permanent/>
                </Scope>
                <DFTitle>token value.</DFTitle>
                <DFType>
                    <MIME>text/plain</MIME>
                </DFType>
            </DFProperties>
        </Node>
    </Node>
</Node>
```

Figure 9:
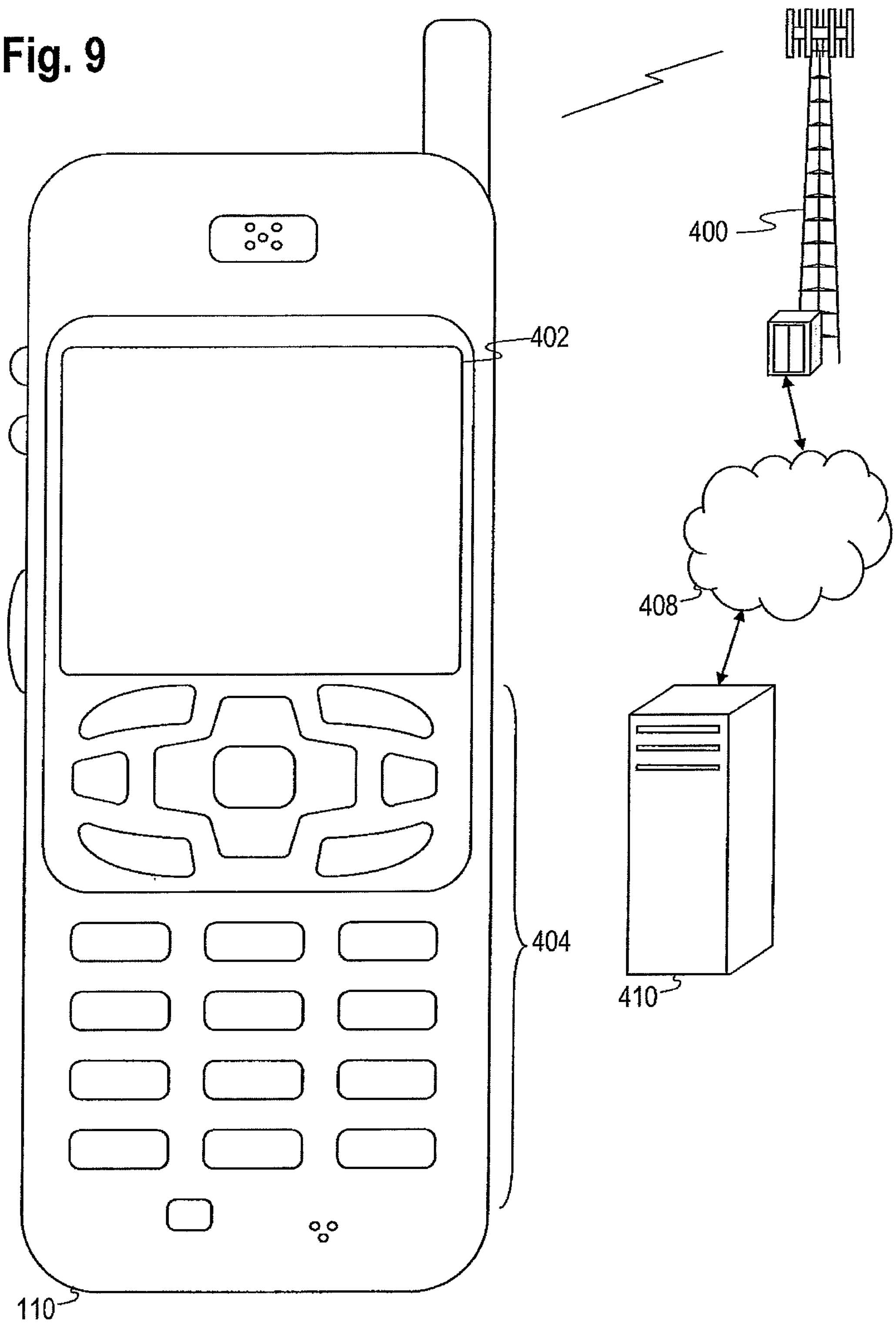
FIG. 9 is a diagram of a wireless communications system including a UA operable for some of the various embodiments of the disclosure.

FIG. 9 illustrates a wireless communications system including an embodiment of the UA 110. The UA 110 is operable for implementing aspects of the disclosure, but the disclosure should not be limited to these implementations. Though illustrated as a mobile phone, the UA 110 may take various forms including a wireless handset, a pager, a personal digital assistant (PDA), a portable computer, a tablet computer, or a laptop computer. Many suitable devices combine some or all of these functions. In some embodiments of the disclosure, the UA 110 is not a general purpose computing device like a portable, laptop or tablet computer, but rather is a special-purpose communications device such as a mobile phone, wireless handset, pager, or PDA. In another embodiment, the UA 110 may be a portable, laptop or other computing device. The UA 110 may support specialized activities such as gaming, inventory control, job control, and/or task management functions, and so on.

The UA 110 includes a display 402. The UA 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 110 may present options for the user to select, controls for the user to actuate, and/or cursors or other indicators for the user to direct. The UA 110 may further accept data entry from the user, including numbers to dial or various parameter values for configuring the operation of the UA 110. The UA 110 may further execute one or more software or firmware applications in response to user commands. These applications may configure the UA 110 to perform various customized functions in response to user interaction. Additionally, the UA 110 may be programmed and/or configured over-the-air, for example from a wireless base station, a wireless access point, or a peer UA 110.

Among the various applications executable by the UA 110 are a web browser, which enables the display 402 to show a web page. The web page may be obtained via wireless communications with a wireless network access node, a cell tower, a peer UA 110, or any other wireless communication network or system 400. The network 400 is coupled to a wired network 408, such as the Internet. Via the wireless link and the wired network, the UA 110 has access to information on various servers, such as a server 410. The server 410 may provide content that may be shown on the display 402. Alternately, the UA 110 may access the network 400 through a peer UA 110 acting as an intermediary, in a relay type or hop type of connection.

FIG. 10 shows a block diagram of the UA 110. While a variety of known components of UAs 110 are depicted, in an embodiment a subset of the listed components and/or additional components not listed may be included in the UA 110. The UA 110 includes a digital signal processor (DSP) 502 and a memory 504. As shown, the UA 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UA 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UA 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UA 110 to send and receive information from a cellular network or some other available wireless communications network or from a peer UA 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UA 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UA 110 and may also enable the UA 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UA 110 to communicate wirelessly with other nearby UAs and/or wireless base stations.

The input/output interface 518 may further connect the DSP 502 to the alert 526 that, when triggered, causes the UA 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UA 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UA 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UA 110 to determine its position. Various other peripherals may also be included to provide additional functions, e.g., radio and television reception.

FIG. 11 illustrates a software environment 602 that may be implemented by the DSP 502. The DSP 502 executes operating system drivers 604 that provide a platform from which the rest of the software operates. The operating system drivers 604 provide drivers for the node hardware with standardized interfaces that are accessible to application software. The operating system drivers 604 include application management services ("AMS") 606 that transfer control between applications running on the UA 110. Also shown in FIG. 11 are a web browser application 608, a media player application 610, and Java applets 612. The web browser application 608 configures the UA 110 to operate as a web browser, allowing a user to enter information into forms and select links to retrieve and view web pages. The media player application 610 configures the UA 110 to retrieve and play audio or audiovisual media. The Java applets 612 configure the UA 110 to provide games, utilities, and other functionality. A component 614 might provide functionality described herein.

Figure 12:
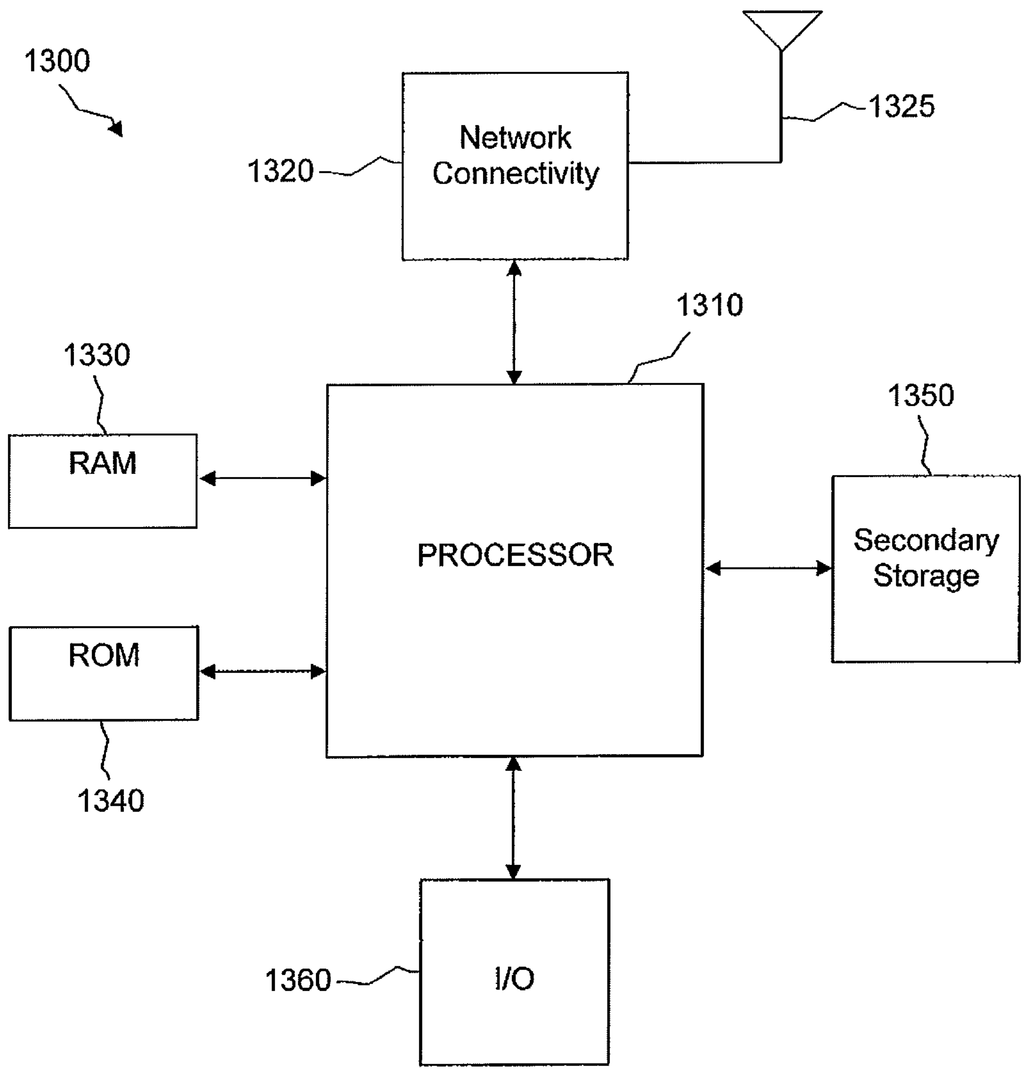
FIG. 12 illustrates an exemplary general-purpose computer system suitable for implementing the several embodiments of the present disclosure.

The UA 110 and other components described above might include a processing component that is capable of executing instructions related to the actions described above. FIG. 12 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) and/or global system for mobile communications (GSM) radio transceiver devices, and other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 110, such as the display 402 and the input 404.

The following Internet Engineering Task Force (IETF) Requests for Comments (RFC) are incorporated herein by reference: RFC 2533, RFC 3840, RFC 3841, and RFC 4483. The following 3rd Generation Partnership Project (3GPP) Technical Specifications (TS) are incorporated herein by reference: TS 23.218, TS 24.229, and TS 24.173. In order to implement the embodiments described herein, the following changes might be made to TS 24.173: addition of text defining usage of the g.3gpp.app_ref as a URI Parameter; addition of text specifying that the telephony application server includes the g.3gpp.app_ref URI Parameter and "Orig" or "Term" in the user part of the URI that is included in the either the Record-Route header or the Contact header; and addition of text that states that when multiple ICSI values are included in the g.3gpp.app_ref media feature tag in the Contact header, the MMTeI ICSI value should be the first in the list.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for indicating an application server (AS) capability, the method comprising:

generating, at the AS, a Session Initiation Protocol (SIP) request including a SIP header comprising a token that identifies at least one service supported by the AS and the SIP request further including an address of the AS, wherein the address is a uniform resource identifier (URI) that is included in a Record-Route header, wherein the AS is included in a signaling route;

transmitting, by the AS, the SIP request; and transmitting, by the AS, a SIP response including the token.

2. The method of claim 1 wherein the URI is a Globally Routable UA URI (GRUU).

3. The method of claim 1 wherein the token indicates whether the at least one service is provided by the AS as an originating AS or a terminating AS.

4. The method of claim 1 wherein the token is an IP (Internet Protocol) Multimedia Subsystem (IMS) Communication Service Identifier (ICSI).

5. The method of claim 4 wherein the URI includes a URI parameter set equal to an ICSI value for a particular service provided by the AS.

6. The method of claim 5 wherein the URI parameter is a g.3gpp.app_ref tag.

7. The method of claim 1 wherein a SIP request that the AS receives from a first UA is a SIP INVITE message.

8. The method of claim 1 wherein the token is associated with the at least one service by one of:

a hard coding of the association; and execution of an algorithm that performs the association.

9. A network component comprising a processor configured to:

generate, at the network component, a Session Initiation Protocol (SIP) request including a SIP header comprising a token that identifies at least one service supported by the network component, the SIP request further including an address of the network component, wherein the address is a uniform resource identifier (URI) that is included in a Record-Route header;

transmit by the network component, the SIP request; and transmit, by the network component, a SIP response including the token.

10. The network component of claim 9 wherein the URI is a Globally Routable UA URI (GRUU).

11. The network component of claim 10 wherein the URI contains a 'gr' parameter.

12. The network component of claim 9 wherein the token is an IP (Internet Protocol) Multimedia Subsystem (IMS) Communication Service Identifier (ICSI).

13. The network component of claim 12 wherein the URI includes a URI parameter that is set equal to the ICSI.

14. The network component of claim 13 wherein the URI parameter is a g.3gpp.app_ref tag.

15. The network component of claim 9, further comprising; receiving, by the network component, a SIP invite from a user agent before generating the SIP request.

16. The network component of claim 15 wherein a user portion of the URI identifies at least one of:

a user agent that originated the SIP INVITE message; and a user agent that terminates the SIP INVITE message.

17. The network component of claim 15 wherein the network component is a telephony application server.

18. The network component of claim 9 wherein the token is associated with the at least one service by one of:

a hard coding of the association; and execution of an algorithm that performs the association.

* * * * *